US011199706B2

(12) United States Patent
Fortin-Deschênes et al.

(10) Patent No.: US 11,199,706 B2
(45) Date of Patent: Dec. 14, 2021

(54) HEAD-MOUNTED DISPLAY FOR VIRTUAL AND MIXED REALITY WITH INSIDE-OUT POSITIONAL, USER BODY AND ENVIRONMENT TRACKING

(71) Applicant: Apple Inc., Cupertino, CA (US)

(72) Inventors: Simon Fortin-Deschênes, Cupertino, CA (US); Vincent Chapdelaine-Couture, Cupertino, CA (US); Yan Côté, Cupertino, CA (US); Anthony Ghannoum, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/032,141

(22) Filed: Sep. 25, 2020

(65) Prior Publication Data

US 2021/0011289 A1 Jan. 14, 2021

Related U.S. Application Data

(63) Continuation of application No. 16/063,004, filed as application No. PCT/CA2017/000033 on Feb. 20, 2017, now Pat. No. 10,838,206.

(Continued)

(51) Int. Cl.
*G02B 27/01* (2006.01)
*G06T 19/00* (2011.01)
*G02B 27/00* (2006.01)

(52) U.S. Cl.
CPC ....... *G02B 27/017* (2013.01); *G02B 27/0093* (2013.01); *G06T 19/006* (2013.01);
(Continued)

(58) Field of Classification Search
CPC ............. G02B 27/017; G02B 27/0093; G02B 2027/0134; G02B 2027/0138;
(Continued)

(56) References Cited

U.S. PATENT DOCUMENTS

2012/0154277 A1 6/2012 Bar-Zeev et al.
2012/0200667 A1 8/2012 Gay et al.
(Continued)

FOREIGN PATENT DOCUMENTS

CN 1940635 A 4/2007
CN 102591016 A 7/2012
(Continued)

OTHER PUBLICATIONS

International Search Report and Written Opinion for PCT/CA2017/000033 dated May 19, 2017.
(Continued)

*Primary Examiner* — Stephen G Sherman
(74) *Attorney, Agent, or Firm* — Fernando & Partners, LLP

(57) ABSTRACT

A Head-Mounted Display system together with associated techniques for performing accurate and automatic inside-out positional, user body and environment tracking for virtual or mixed reality are disclosed. The system uses computer vision methods and data fusion from multiple sensors to achieve real-time tracking. High frame rate and low latency is achieved by performing part of the processing on the HMD itself.

20 Claims, 13 Drawing Sheets

Related U.S. Application Data

(60) Provisional application No. 62/296,829, filed on Feb. 18, 2016.

(52) U.S. Cl.
CPC .............. *G02B 2027/014* (2013.01); *G02B 2027/0134* (2013.01); *G02B 2027/0138* (2013.01); *G02B 2027/0187* (2013.01)

(58) Field of Classification Search
CPC ...... G02B 2027/014; G02B 2021/0187; G06T 19/006; G06F 3/011–015
See application file for complete search history.

(56) References Cited

U.S. PATENT DOCUMENTS

| | | |
|---|---|---|
| 2013/0120224 A1 | 5/2013 | Cajigas et al. |
| 2014/0055560 A1* | 2/2014 | Fu .................. G06T 7/40 348/42 |
| 2014/0152676 A1 | 6/2014 | Rohn et al. |
| 2014/0266989 A1 | 9/2014 | Takahashi et al. |
| 2014/0285521 A1 | 9/2014 | Kimura |
| 2014/0364197 A1 | 12/2014 | Osman et al. |
| 2014/0375540 A1 | 12/2014 | Ackerman et al. |
| 2015/0043770 A1 | 2/2015 | Chen et al. |
| 2015/0317833 A1 | 11/2015 | Ebstyne et al. |
| 2015/0325052 A1 | 11/2015 | Kuehne |
| 2015/0331485 A1* | 11/2015 | Wilairat ............ G02B 27/0093 345/156 |
| 2015/0379772 A1 | 12/2015 | Hoffman |
| 2015/0381974 A1 | 12/2015 | Hoffman et al. |
| 2016/0034042 A1 | 2/2016 | Joo |
| 2016/0035139 A1 | 2/2016 | Fuchs et al. |
| 2016/0148429 A1 | 5/2016 | Groppa et al. |
| 2017/0061693 A1 | 3/2017 | Kohler et al. |
| 2017/0316613 A1 | 11/2017 | Wright et al. |

FOREIGN PATENT DOCUMENTS

| | | |
|---|---|---|
| CN | 103843322 A | 6/2014 |
| CN | 104281266 A | 1/2015 |
| JP | 2003-091741 A | 3/2003 |
| JP | 2005-107970 A | 4/2005 |
| JP | 2011-118724 A | 6/2011 |
| JP | 2014-199527 A | 10/2014 |
| JP | 2014-199532 A | 10/2014 |
| KR | 1020130000401 A | 1/2013 |
| KR | 1020130130740 A | 1/2019 |
| WO | 2011106798 A1 | 9/2011 |
| WO | 2012082807 A2 | 6/2012 |
| WO | 2016014878 A1 | 1/2016 |

OTHER PUBLICATIONS

International Preliminary Report on Patentability for PCT/CA2017/000033 dated Aug. 30, 2018.
Australian Examination Report dated Mar. 5, 2019, Australian Application No. 2017220404, pp. 1-6.
Office Action for Japanese Appl. No. 2018-543195 dated Sep. 9, 2019.
Office Action for Korean Application No. 10-2018-7022953 dated Nov. 28, 2019.
Office Action for corresponding JP Appl. No. 2013-074187 dated Jun. 1, 2020.
Examination Report for corresponding European Appl. No. 17752585.4 dated Jul. 22, 2020.
Office Action for corresponding Chinese Application No. 201780009450.9 dated Apr. 14, 2021.
Preliminary Rejection for corresponding Korean Application No. 10-2020-7002599 dated May 24, 2021.
Third Chinese Office Action dated Oct. 27, 2021, Chinese Patent Application No. 201780009450.9, pp. 1-11 (Includes Reporting Letter from Foreign Agent).

\* cited by examiner

HEAD-MOUNTED DISPLAY FOR VIRTUAL AND MIXED REALITY WITH INSIDE-OUT POSITIONAL, USER BODY AND ENVIRONMENT TRACKING

CROSS-REFERENCE TO RELATED APPLICATIONS

This application claims the benefits of U.S. Provisional Patent Application No. 62/296,829, filed on Feb. 18, 2016, and U.S. Non-Provisional patent application Ser. No. 16/063,004, filed on Sep. 25, 2018, which is a U.S. National Stage Application under 35 U.S.C. § 371 of International App. No. PCT/CA2017/000033, filed on Feb. 20, 2017, which are herein incorporated by reference in their entireties.

TECHNICAL FIELD

The present invention relates to the field of head-mounted displays (HMD) used for applications that immerse a user in a virtual reality (VR) or an augmented/mixed reality (MR) environment

BACKGROUND

The objective of immersion in a virtual world is to convince a user's mind to perceive a non-physical world as if it were real. The concept of reality here refers more to the notion of perceptual plausibility rather than representing a real world. In virtual reality (VR), immersion is achieved by displaying computer generated graphics that simulate a visual experience of a real or imagined world. The quality of immersion is subject to several important factors. For instance, characteristics of the display such as image quality, frame rate, pixel resolution, high dynamic range (HDR), persistence and screen-door effect (i.e., the visible lines between pixels on the screen). The quality of the immerse experience decreases when the displayed field of view is too narrow or if the various tracking functions are slow and/or inaccurate (leading to disorientation and nausea; otherwise known as simulation sickness). Immersion is also impacted by the camera system performance such as the image quality (noise, dynamic range, resolution, absence of artifacts) and the coherence between the virtual graphics (3D modeling, textures and lighting) and the pass-through images. In mixed reality (MR), virtual elements are composited in real-time into the real world environment seen by the user. Physical interaction between the virtual elements and real world surfaces and objects can be simulated and displayed in real-time.

Tracking of various elements is generally recognized as an essential prerequisite for achieving a high end VR and MR application experience. Among these elements, positional head tracking, user body tracking and environment tracking play a key role in achieving great immersion.

Positional head tracking (referred to as positional tracking from here on), which aims to estimate the position and orientation of the HMD in an environment, has to be both low latency and accurate. The reason for this being that the rendered graphics must closely match the user's head motion in order to produce great immersion in VR and the need to correctly align the virtual content in the real world in MR. Some methods try to solve positional tracking in a room whose size is approximately 5×5 meters or smaller by using a setup external to the HMD. For instance, a stationary infrared (IR) or color (RGB) camera can be positioned to see an IR or RGB light-emitting diode (LED) array located on the surface of the HMD that would be used to estimate the head position. Other methods are be based on flooding and sweeping the room with IR light generated by one or two base stations, synchronized with multiple IR photosensors precisely positioned on the HMD. The head pose can be calculated in real-time at a high frame rate by considering the detection times of the photosensors. Note that both these approaches limit the area within which the user can move in order to maintain tracking. The user has to be visible to the IR or RGB cameras or alternately be covered by the base station IR emitters. Occlusion may cause tracking inaccuracies.

User body tracking estimates the position and orientation of the user's body (in particular, but not limited to hands and fingers) relative to the HMD. It can provide in both VR and MR, a means of user input (e.g. hand gestures) enabling interaction with virtual elements. While some positional tracking methods can be used for hand tracking as well (e.g. an IR camera with an array of LEDs on hand-held controllers), other methods take advantage of a smaller analysis space, typically within one meter from the HMD, to increase the robustness of the hand and finger tracking algorithms. For instance, close-range Time-of-Flight (ToF) cameras can be integrated with or in the HMD. These cameras can yield a depth map of the hands from which a skeletal model of the hands can be constructed. Another approach uses an IR LED flood light together with cameras to segment out and estimate 3D points on the hands and fingers.

Environment tracking is meant to be very general and involves recognizing and tracking objects in the environment. The notion of objects ranges from a simple flat surface to more complex shapes including moving objects such as humans, translucid objects and light sources. Environment tracking estimates the position and shape of surfaces and objects in the vicinity of the HMD. Virtual elements can then interact with the detected (estimated) objects. An occlusion mask can be extracted from the tracking information to avoid situations where real objects may inadvertently be hidden by a virtual element that should be located further away or behind the object. In practice, computer vision methods are used to recover features (corners, edges, etc.) and scene depths, which are then used to learn and recognize object descriptions.

The use of external components for tracking purposes typically impose a limit on the freedom of the user to move in space and often adds calibration steps before the HMD can be used.

Accordingly, there is a need for an HMD that integrates all of the required tracking components in a compact user-friendly product enabling mobility for the application.

SUMMARY

In accordance with an aspect of the disclosure, there is provided a wearable head-mounted display (HMD) that integrates of all required tracking components therein allowing for a more compact user-friendly device.

In accordance with an aspect of the disclosure, there is provided a Head-Mounted Display (HMD) device used for applications that immerse a user in a virtual reality (VR) or an augmented/mixed reality (MR) environment, comprising:

a pair of RGB camera sensors and associated lenses with infrared (IR) cut-off filters;

a pair of mono camera sensors with near infrared (NIR) bandpass filters and associated lenses;

an inertial measurement unit (IMU);

a time of flight (ToF) camera sensor with an associated IR emitter;

a speckle pattern projector;

a display; and at least one processing unit operatively connected to the pair of RGB camera sensors, the pair of mono cameras sensors, the IMU, the ToF camera sensor and associated IR emitter, speckle projector and display via at least one communication link, the at least one processing unit generating graphic content using data streams from the pair of RGB camera sensors, the pair of mono cameras sensors, the IMU and the ToF camera sensor and displaying the graphic content through the display.

In accordance with an aspect of the disclosure, there is provided an HMD device as disclosed above, wherein the pair of RGB camera sensors and the pair of mono camera sensors are combined into a pair of RGB/IR cameras with associated lenses, the pair of RGB/IR cameras using a Bayer format with a R-G-IR-B pattern instead of the standard R-G-G-B pattern.

In accordance with an aspect of the disclosure, there is provided an HMD device as disclosed above, wherein the at least one processing unit has an associated memory comprising instructions stored thereon, that when executed on the at least one processing unit perform the steps of:

obtaining from the pair of RGB camera sensors pass-through stereo view images;

obtaining from the pair of mono camera sensors stereo images;

obtaining a dense depth map;

obtaining inertial measurements from the IMU;

performing embedded tracking using the pass-through stereo view images, the stereo images, the dense depth map and the inertial measurements;

performing image processing on the pass-through stereo view images and the stereo images;

generating rendered graphics based on the positional tracking;

performing graphics image processing on the rendered graphics;

mixing processed images and the processed rendered graphics resulting in the graphic content; and providing the graphic content to the display.

In accordance with an aspect of the disclosure, there is provided an HMD device as disclosed above, wherein the step of performing embedded tracking includes performing positional tracking and user body tracking, and may also include performing environment tracking.

In accordance with an aspect of the disclosure, there is provided an HMD as disclosed above, wherein:

the step of performing positional tracking includes:

detecting rotationally and scaled invariant 2D image features in the pass-through stereo view images and the stereo images;

estimating a depth of each detected feature using stereoscopic matching, yielding a cloud of 3D points; and tracking in real-time the cloud of 3D points to infer head position changes;

the step of performing positional tracking may further include using the inertial measurements to temporarily compute positional changes when the pass-through stereo view images and the stereo images do not provide enough information;

the step of performing user body tracking includes:

performing body segmentation on the dense depth map;

extracting a body mesh from the dense depth map and the body segmentation;

extracting a skeletal model the body mesh; and recognizing predefined gestures by tracking body motion of the user and matching the skeleton model and body motion of the user to gesture models;

and the step of performing environment tracking includes:

generating a motion model using the pass-through stereo view images, the stereo images and the positional tracking;

detecting key-points;

extracting features local to the keypoints using robust feature descriptors; and estimating surface descriptors by fusing the dense depth map with the extracted features.

In accordance with an aspect of the disclosure, there is also provided a method for immersing a user in a virtual reality (VR) or an augmented/mixed reality (MR) environment, the method comprising the steps implemented by the HMD device.

BRIEF DESCRIPTION OF THE DRAWINGS

Embodiments of the disclosure will be described by way of examples only with reference to the accompanying drawings, in which.

Figure 1:
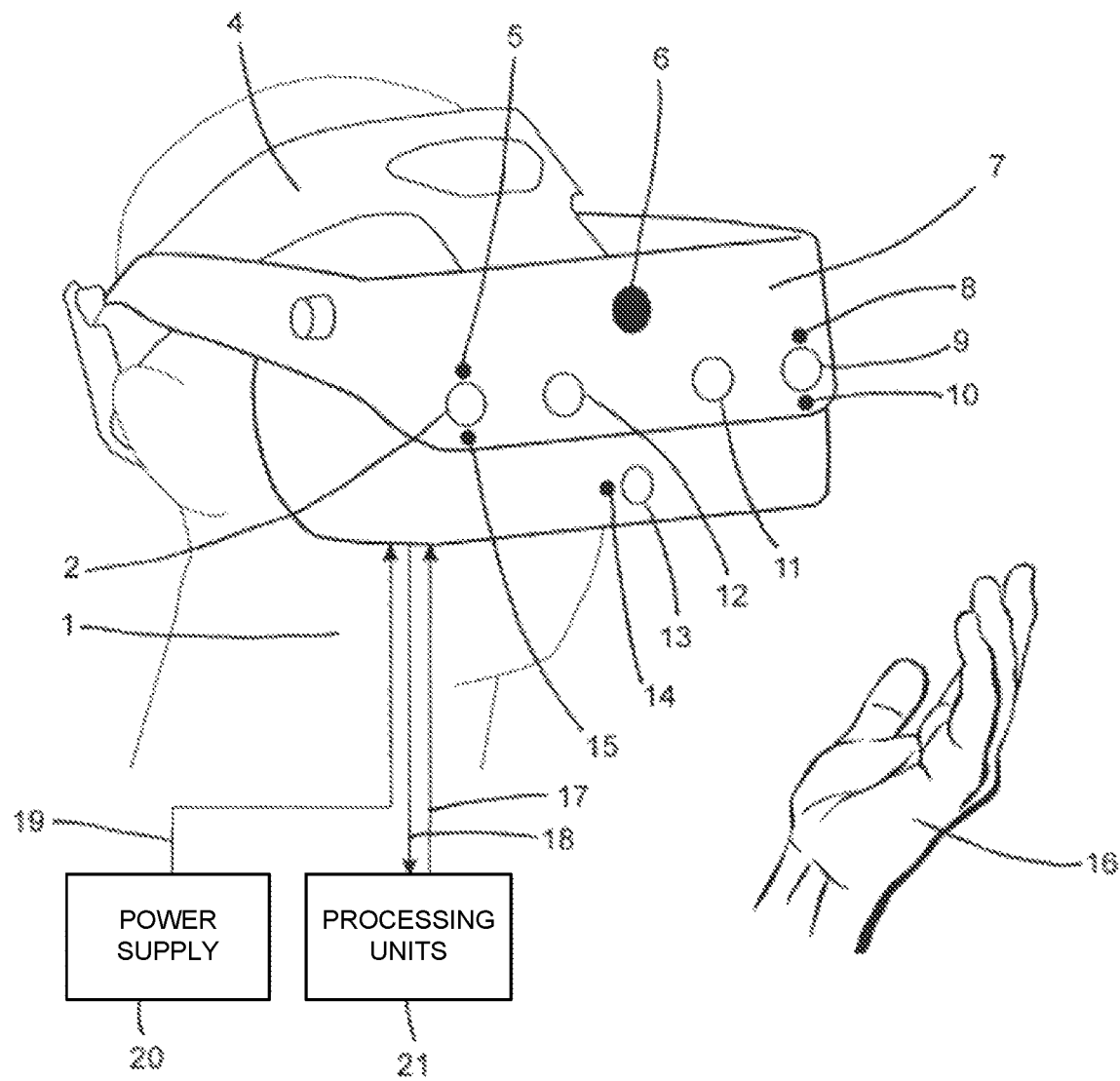
FIG. 1 is a schematic representation of a user wearing head-mounted display (HMD) provided with several cameras and infrared (IR) emitters in accordance with an illustrative embodiment of the present disclosure.

Similar references used in different Figures denote similar components.

DETAILED DESCRIPTION

Generally stated, the non-limitative illustrative embodiments of the present disclosure provide a head-mounted display (HMD) that improves the user experience in the context of both virtual reality (VR) and mixed reality (MR). The HMD is relatively light, economically comfortable and provides high resolution content with low latency. The HMD supports either graphics content coming from an external computer equipped with a high-performance graphical processing unit (GPU) or from an embedded GPU, and low latency MR is achieved by having the HMD perform some processing, such as embedded video pass-through, with corrections of lens distortion and color aberration, as well as graphics/pass-through compositing to guarantee low-latency. Positional, user body and environment tracking are achieved by a unique inside-out approach for which all required tracking components are integrated in the HMD, avoiding the need to setup and use external input components. This approach allows a user to move freely within a large environment.

Among VR and MR applications, some embodiments are particularly useful in immersive gaming or entertaining applications, where some controls or interactions can be achieved by tracking the player's head and hand movements, as well as external environment objects. Among possible applications are simulations in general, collaborative training, sales, assisted manufacturing, maintenance and repair.

The proposed HMD system implements virtual reality by having a user look at a display through a wide angle eyepiece. The proposed embodiments use a single organic light-emitting diode (OLED) display, however other types of display solutions can be employed, such as two smaller displays, micro displays, or flexible displays, etc. For MR, minimally, two forward facing cameras capture the environment from view points located as close as possible to the user's eyes (prisms and/or mirrors may be employed or not, hence camera orientation may be required to be other than forward facing). The camera images are then merged in real-time with computer generated images and shown on the display system. This approach does not allow the user to see through the opaque display, but rather captures images that the user's eyes would see if they were not occluded by the opaque display. An alternative approach is the use of see-through displays (e.g., composed of glasses, mirrors and/or prisms) that allow the user to see virtual content while still being able to see the environment. These however typically have a narrow field of view which considerably decreases the sense of believable immersion.

The purpose of the cameras is not just limited to providing a pass-through view. The camera images and an integrated inertial measurement unit (IMU) provide data that can be processed by computer vision methods to automatically analyze and understand the environment. Furthermore, the HMD is designed to support not only passive computer vision analysis, but also active computer vision analysis. Passive computer vision methods analyze image information captured from the environment. These methods can be monoscopic (images from a single camera) or stereoscopic (images from two cameras). They include, but are not limited to, feature tracking, object recognition and depth estimation. Active computer vision methods add information to the environment by projecting patterns visible to the cameras but not necessarily visible to the human visual system. Such techniques include time of flight (ToF) cameras, laser scanning or structured light to simplify the stereo matching problem. Active computer vision is used to achieve scene depth reconstruction. An infrared (IR) projector is used to project a random IR speckle pattern onto the environment, adding texture information in order to make stereo matching easier where it is ambiguous (e.g., uniform textures or surfaces). ToF cameras may also be included in some embodiments. Active computer vision is used to support tracking with an IR flood light for low or no light conditions.

The aforementioned capabilities make the HMD unique and suitable to be used in a wide range of applications. For instance, the HMD can be used as a stereo camera for recording purposes or real-time vision processing. It can also be used as an environment scanner (active stereo). In the context of an HMD, the computer vision methods use data from heterogeneous sensors to automatically track the head position, the user body and the environment. However, realizing such a product assembly with the ability to implement passive feature tracking and active stereo vision is challenging in terms of performance. This is especially true when considering that a low latency system is required in order to achieve good immersion and weight/ergonomics must be optimized to further ensure user comfort and ease of use. Latency in the context of HMDs is the time interval between the captured data (IMU, images) and the corresponding displayed content. Latency smaller than 20 ms must be achieved to produce great immersion and avoid sickness and nausea. Low latency is achieved by implementing/embedding the processing on the HMD itself, with the aid of an external computer where more processing power is available. As processing units evolve by becoming smaller and consuming less power, all processing may be done on the HMD itself. The embedded processing avoids transferring high-resolution camera images to the external computer, thus reducing the transfer bandwidth and latency requirements. In practice (particularly), the computer vision processing and graphics rendering can be mostly done on the external computer, but the HMD must minimally perform camera image signal processing (ISP) functions such as synchronization, combining, debayering, correction of the image distortion for display, as well as the MR compositing of the rendered graphics and camera images.

Thus, the HMD is designed to include the necessary components to apply passive or active stereo vision methods to achieve positional, user body and environment tracking. The HMD may also be compatible with some third-party external emitters that add visual information onto the environment. For instance, any projection of a textured pattern onto the environment may help stereo matching. The actual tracking algorithms typically involve stereo matching, IMU data integration, feature detection/tracking, object recognition and surface fitting. However, the HMD makes the data streams available to third-party software developers so that custom algorithms can be implemented.

Referring to FIG. 1, there is shown a head-mounted display (HMD) (7) in accordance with an illustrative embodiment of the present disclosure. The HMD (7) is attached via a harness (4) onto the head of a user (1) and integrates multiple sensors to achieve mixed reality (MR) and inside-out positional, user body and environment tracking, namely two RGB cameras (11, 12) for pass-through purposes, two infrared (IR) cameras (2, 9) for stereo vision analysis, an inertial measurement unit (IMU) (not shown in the figure) and a time-of-flight (ToF) camera (13) with its IR emitter (14) for dense depth sensing. A collection of IR light-emitting diodes (LED) emitters (5, 8, 10, 15) is also integrated to light the environment in low light conditions. The HMD (7) is also equipped with an IR speckle projector (6) to achieve active stereo computer vision and extract a three-dimensional (3D) dense map. Various data streams (camera images, IMU data) are captured, are optionally compressed, and then transmitted to processing units (21), which may be part of the HMD (7) or of an external computer. Communications between the HMD (7) and the processing units (21) is performed through communication links (17, 18), which may be wired, wireless or a combination of both. In an alternative embodiment where the processing units (21) are part of the HMD (7), the communication links (17, 18) may be omitted. The processing units (21) render graphic content (game view, video, virtual objects, etc.) to be displayed in the HMD (7). The HMD (7) is powered by power supply (20) via power link (19). In an alternative embodiment, the power supply (20) may be integrated within the HMD (7).

Figure 2A:
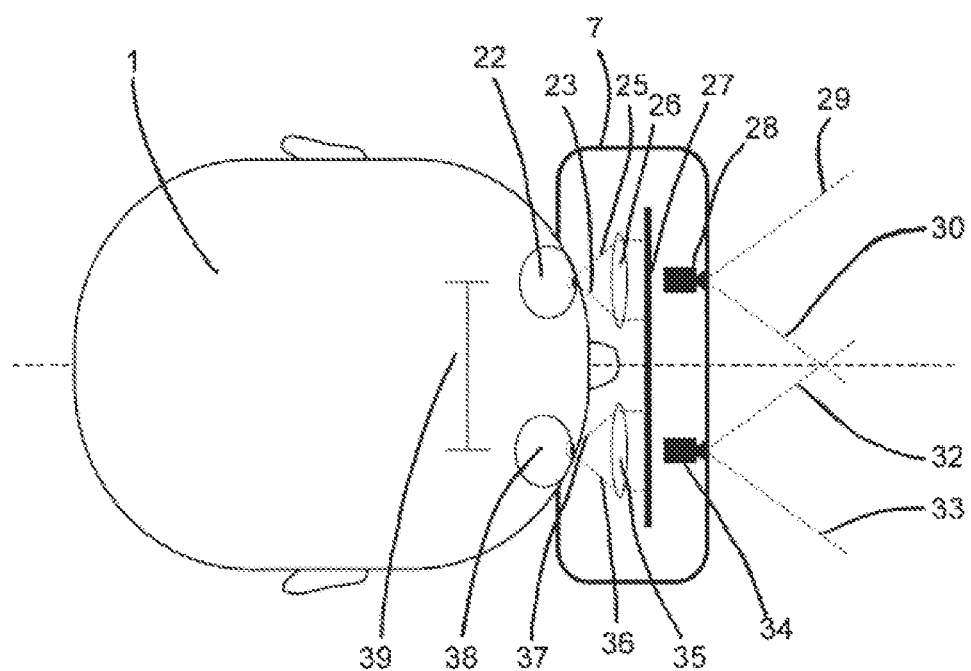
FIG. 2A is a schematic top view of an exemplary embodiment of the optics, display and cameras used to achieve both virtual and mixed reality.

Referring now to FIG. 2A, there is shown an exemplary HMD (7) to achieve VR and MR. The user (1) wearing the HMD (7) looks at a display (27) through wide angle eyepieces (26, 35). Two RGB cameras (28, 34) located in front of the eyes (22, 38) capture the environment that the user's eyes would see if they were not occluded by the HMD (7). Note that the figure only includes the cameras required for the HMD (7) and does not include other cameras used for computer vision analysis. In the illustrative embodiment, the baseline (39) of the cameras (28, 34) is 64 mm, the average human eye separation (note that camera baseline can be something other than 64 mm), and the position of the cameras (28, 34) is advantageously aligned with the user's eyes (22, 38) in order to minimize the incoherence of the user visual perception. The field of view (29, 30, 32, 33) of the cameras (28, 34) must closely match the field of view (23, 25, 36, 37) of the eyes (22, 38).

Figure 2B:
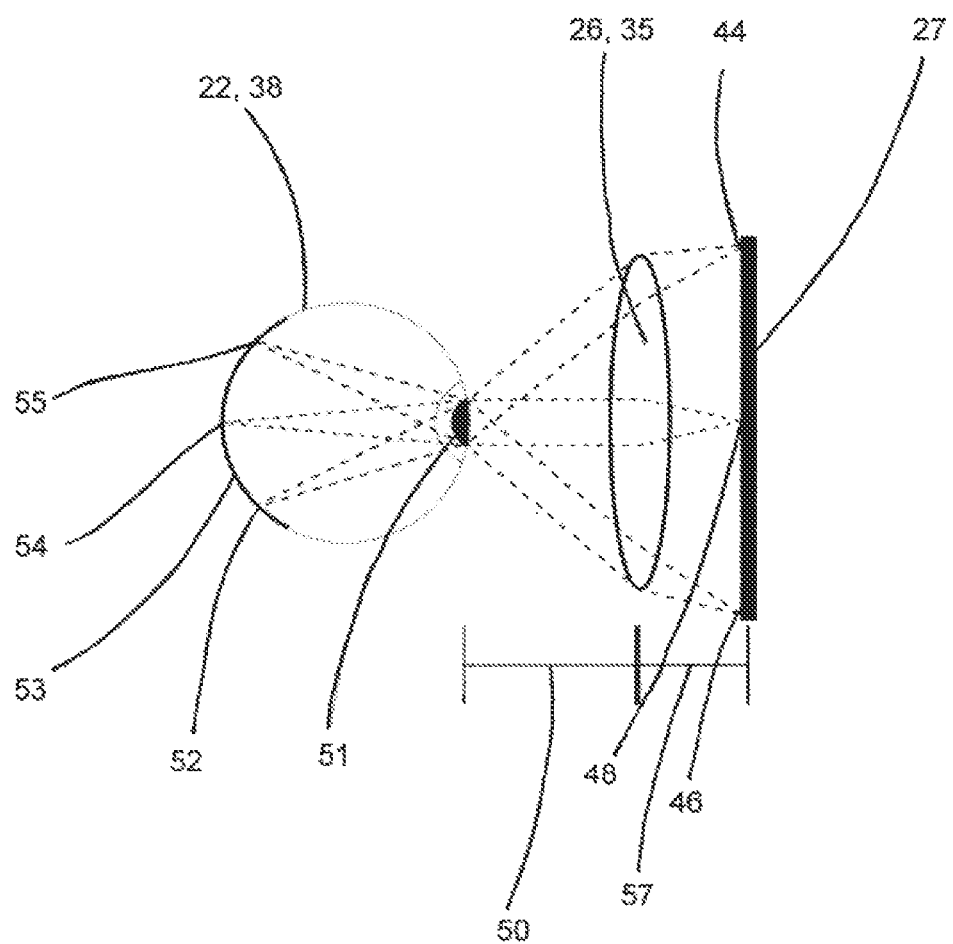
FIG. 2B is a schematic view of an exemplary embodiment of the optics, in a close-up view, illustrating how light rays of the display focus on the retina of the eye of the user.

FIG. 2B illustrates how light rays (44, 46, 48) emitted by the display (27) pass through the eyepiece (26, 35) to focus again (52, 54, 55) on the retina (53). The position of the pupil (51) relative to the eyepiece (26, 35) as well as the distance from the eyepiece (26, 35) to the display (27) needs to be adjusted to get correct focus (i.e. distances 50 and 57 respectively). Note that the figure shows a single wavelength, while the eyepiece (26, 35) typically induces color aberration which needs to be compensated.

The HMD provides visual data streams to allow the following capabilities: stereo images for the display system (which we call the pass-through stereo view), stereo images for tracking purposes, dense depth sensing (close and middle range) and inertial measurements. In the illustrative embodiment, close range depth sensing is considered to be smaller than 1.5 m; whereas a middle range depth sensing is considered to cover depths further away than one meter (up to about 4-5 meters).

Figure 3:
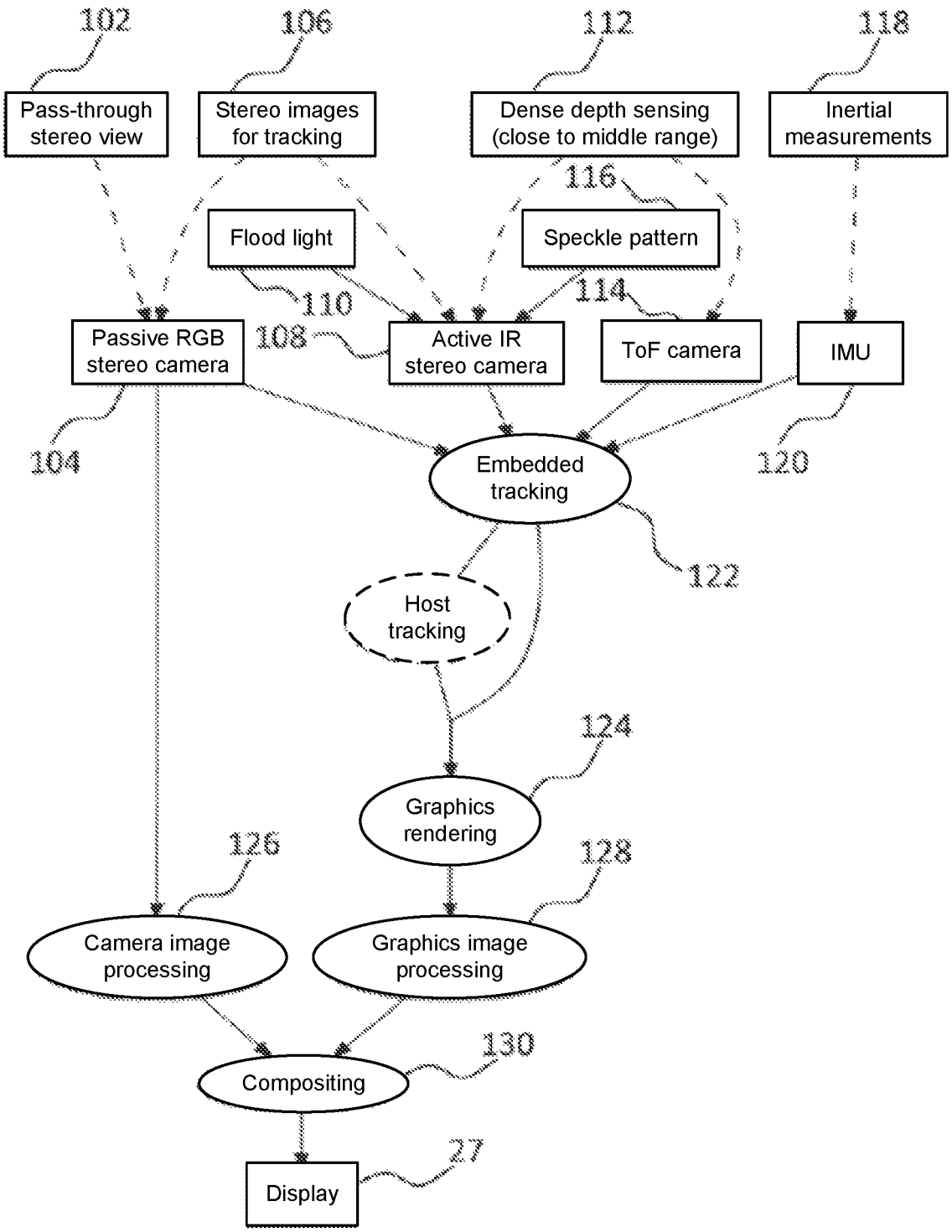
FIG. 3 is a flow diagram of the visual sensory generation process of the HMD along with an exemplary embodiment for each capability.

FIG. 3 shows the visual sensory generation process of the illustrative embodiment of the HMD. The pass-through stereo view (102) is captured by an RGB stereo camera (104). Stereo images (106) for tracking can also be captured by the RGB stereo camera (104), or rather by an IR stereo camera (108) assisted with an IR flood light (110) for poor light conditions. Dense depth sensing (112) requires adding projected IR information to recover depth when there is not enough visual information to implement stereo matching. In the illustrative embodiment, two solutions are used to provide a depth dense map. First, a ToF camera (114) recovers depth based on the time it takes for a light ray to leave its associated IR emitter (110) and reflect back onto the ToF camera sensor (108). Second, an IR speckle pattern (116) is projected onto the environment and seen by the IR stereo camera (108). While the latter requires computationally expensive stereo matching, it typically provides a higher resolution depth map than the former solution. Depending on the cost target, type of market, technological approach, device resolution, performance and feature-set, different choices in the embodiments can be made and several functional blocks can be combined. Inertia! measurements (118) taken by the IMU (120) are also captured and provided to the embedded tracking module (122). While parts of the computer vision processing and graphics rendering (124) may be done on an external computer, some of the image processing steps need to be done in the HMD itself in order to reduce the overall system latency. In FIG. 3, the camera image processing module (126) performs some tasks such as trigger control, debayering, automatic white balance, defective pixel replacement, flat field correction, filtering (noise reduction, edge enhancement), distortion and aberration correction. The graphics image processing module (128) performs decoding (e.g., color and alpha channel), distortion and aberration correction. The compositing module (130) mixes the rendered graphics and the camera images, the resulting images being displayed on the display (27).

Figure 4A:
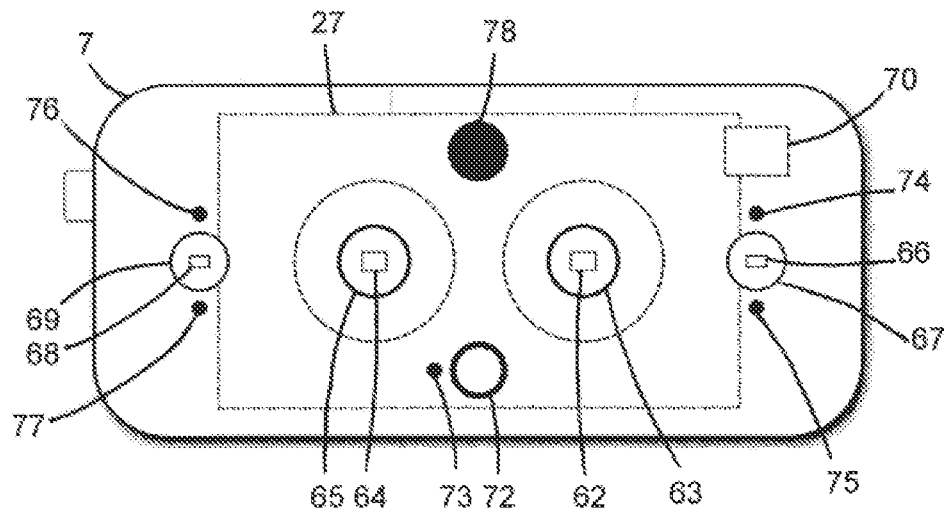
FIG. 4A shows the front view of a first exemplary embodiment of the HMD device, with two RGB cameras optimized for pass-through purposes (MR) and two IR cameras that provide visual data for tracking.
Figure 4B:
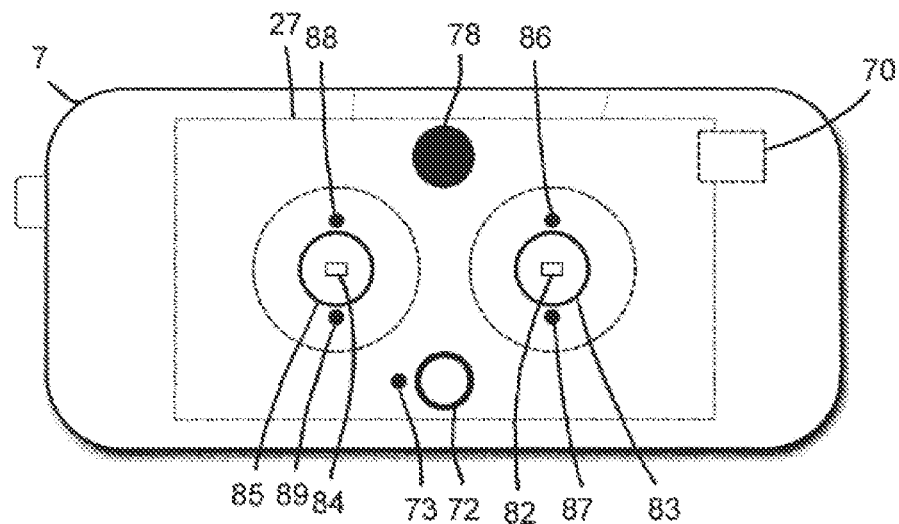
FIG. 4B shows the front view of a second exemplary embodiment of the HMD device, with two RGB/IR cameras that achieve both MR and positional tracking.

Exemplary embodiments of the HMD (7) are shown in more detail in FIGS. 4A and 4B. In a first exemplary embodiment, shown in FIG. 4A, the HMD (7) has two RGB camera sensors (62, 64) and lenses (63, 65) with IR cut-off filters for better pass-through quality. It also integrates two mono camera sensors with near infrared (NIR) bandpass filters (66, 68) and lenses (67, 69) optimized for computer vision analysis. Other components include a display (27), a 9-degrees of freedom IMU (70) (composed of a gyroscope, an accelerometer and a magnetometer) and a ToF camera sensor (72) with its associated IR emitter (73). LED flood lights (74, 75, 76, 77) are used to improve positional tracking in low light conditions. A speckle projector (78) is used to add texture into the environment to improve dense depth map results from stereo matching. In a second exemplary embodiment, shown in FIG. 4B, the HMD (7), uses only three cameras, namely two RGB/IR cameras (82, 84) (RGB/IR sensors use a Bayer format with a R-G-IR-B pattern instead of the standard R-G-G-B pattern) with lenses (83, 85) and LED flood lights (86, 87, 88, 89), and a ToF camera sensor (72) and its associated IR emitter (73). While it is possible to achieve all four required capabilities with only two RGB/IR cameras (82, 84), the result is often not optimal because the requirements vary depending on the purpose. In particular, it is not always possible to clearly separate the RGB and IR signals when using an RGB/IR sensor, especially when pixel saturation is present. As described in the exemplary embodiment of FIG. 4A, using two camera pairs (62, 64, 66, 68) (one for pass-through purposes and one for tracking) allows optimization of the usage specifications. For instance, RGB and IR bandpass filters can be installed on the pass-through (62, 64) and tracking (66, 68) sensors, respectively, in order to improve image quality. Furthermore, pass-through cameras require the use of fisheye lenses to capture a wide field of view, matching the human visual system. However, these lenses decrease the angular resolution required to get high tracking precision. Both tracking and active depth map sensors need to have a high signal-to-noise ratio (SNR) to increase the ability of matching the speckle pattern in an active stereo vision method. To better accomplish this goal, sensor placement on the HMD (7) may be optimized as well. Note that the tracking sensors (66, 68) are placed on a baseline larger than the human eye separation to increase the precision of the depth estimation in the environment, which is performed by triangulating stereo matches. Placing the tracking sensors (66, 68) along a common axis with the pass-through sensors (62, 64) makes it easier to combine or remap the data from one sensor pair to the other.

Figure 5:
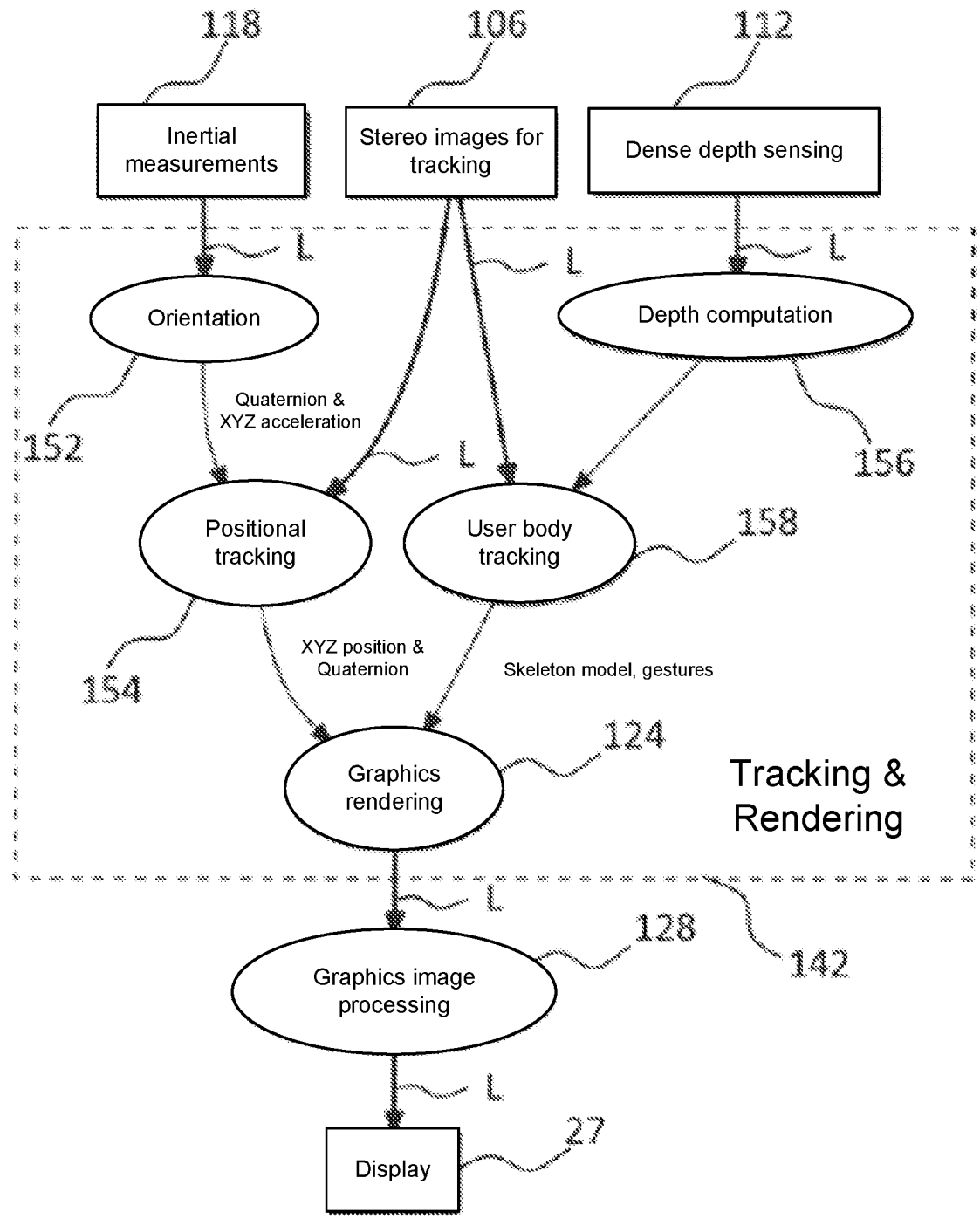
FIG. 5 is a flow diagram of the processing steps to achieve VR with positional and user body tracking.
Figure 6:
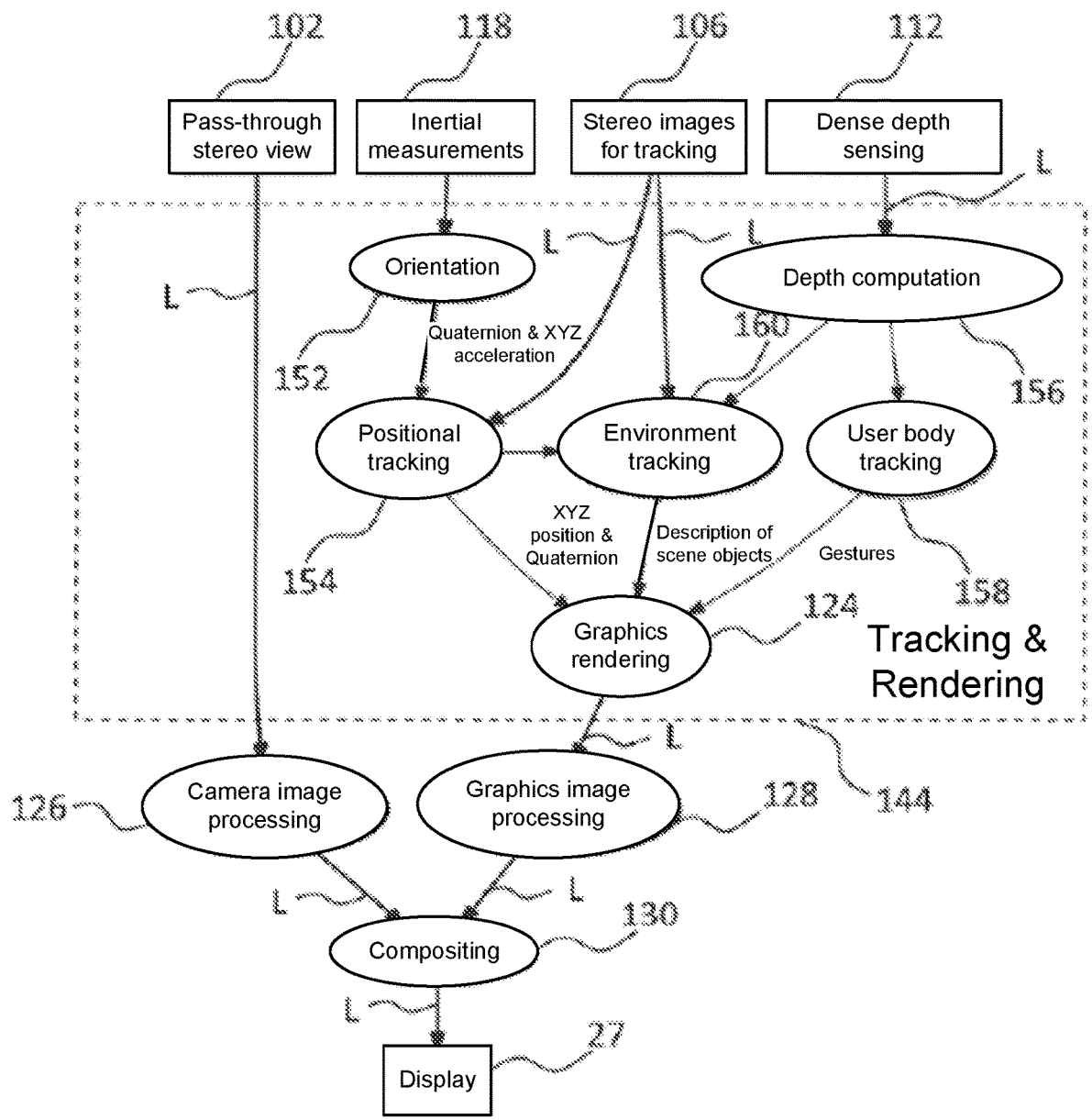
FIG. 6 is a flow diagram of the processing steps to achieve MR with positional, user body and environment tracking.

FIGS. 5 and 6 show the required data and processing steps to achieve VR and MR, respectively. Links L represent controlled low latency data streams and processing with minimal latency jitter. The tracking and rendering sections (142, 144), can be executed partially or wholly in the HMD (7) itself or on an external computer, depending on the embodiment. It is to be noted that the depth computation (156) can be more or less computationally intensive depending on what depth sensing component the embodiment uses (i.e. ToF camera, IR stereo matching or both).

Each of the tracking and rendering sections (142, 144) includes orientation determination (152), positional tracking (154), user body tracking (158), environment tracking (160), graphics rendering (124), depth map estimation (156), IR time-multiplexing, as well as some of the hardware components, namely the speckle projector (78) and IR filters IR camera sensors (66, 68), which will be further described. It is to be understood that the tracking and rendering sections (142, 144) described hereon are exemplary tracking processes given the input data. The data streams (IMU data, images) are made available to third-party software developers so that they can design and implement their own tracking algorithms.

Positional Tracking

Figure 7:
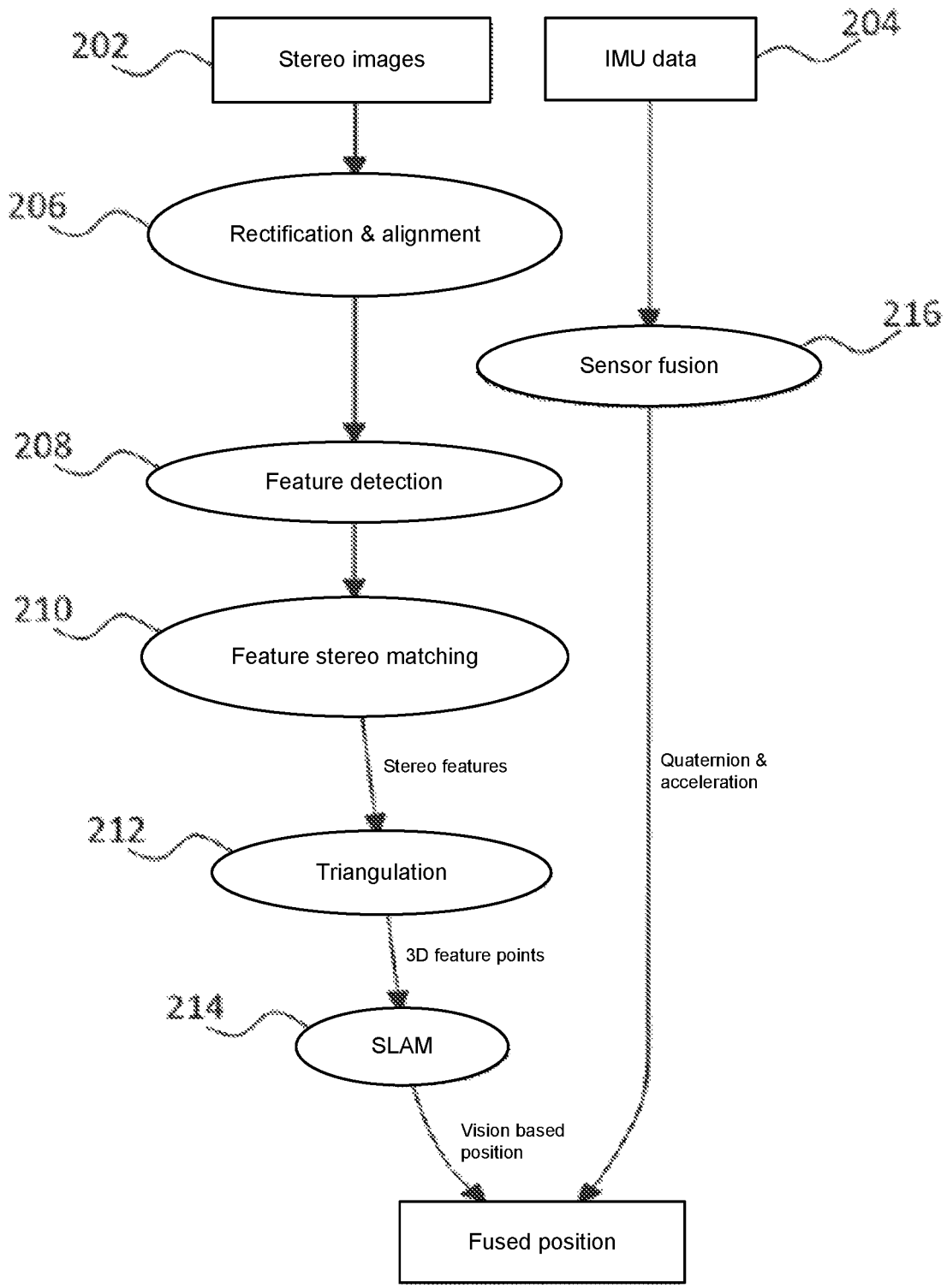
FIG. 7 is a flow diagram of an exemplary process to achieve positional tracking.

FIG. 7 shows a flow diagram of an exemplary process to achieve positional tracking (154). The process falls into the class of simultaneous localization and mapping (SLAM) algorithms. While the dense depth map given by active stereo can be used to detect and track 3D features (it is to be noted that 2D features are based on texture whereas 3D features and based on depth and can be extracted from a point cloud), a sparse matching approach is herein described because it better suits the scenarios with real-time constraints. The inputs of the algorithm are the stereo images (202) for tracking and the IMU data (204). First, the process detects rotationally (206) and scaled invariant 2D image features (208) in the stereo image. Next, the depth of each feature is estimated by using stereoscopic matching (210). This process yields a cloud of 3D points (212), which in turn is tracked in real-time to infer head position changes (214). As the environment is assumed static, any feature on a moving person or object is filtered out, by a RANSAC method with rigid motion assumptions. Gyroscope and accelerometer data are used to temporarily compute positional changes (216) when the tracking images do not provide enough information.

User Body Tracking

Figure 8:
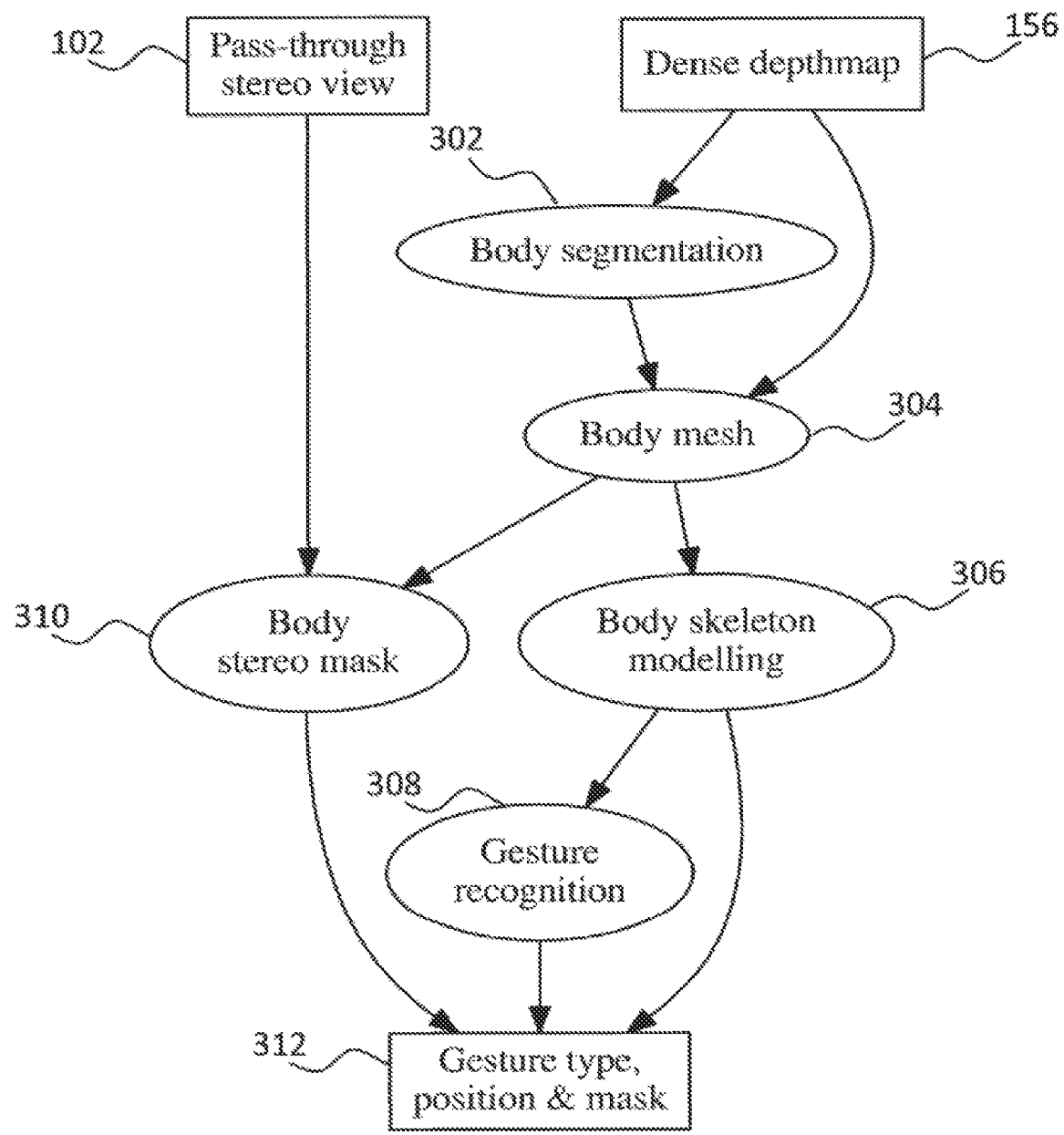
FIG. 8 is a flow diagram of an exemplary process to achieve user body tracking.

FIG. 8 shows a flow diagram of an exemplary process to achieve user body tracking (158). In virtual reality, the user's body needs to be drawn and seen to achieve immersion. To this end, the field of view over which the tracking is performed should match the field of view of the pass-through cameras. The ToF camera sensor (72) offers a low resolution but direct solution to get close depth data in a relatively smaller field of view (e.g. 90 degrees horizontally). From this standpoint, stereo cameras (66, 68) supported with the LED flood lights (74, 75, 76, 77) provide better resolution at the cost of more image processing computation time. In the exemplary process, the body mesh (304) is extracted from the depth (156) and body segmentation (302) information by detecting close 3D data, or rather, by applying a threshold on the intensity when using the LED flood lights (74, 75, 76, 77). Next, a skeletal model (306) is extracted from the mesh. Finally, predefined gestures are finally recognized (308) by tracking the body motion and matching the skeleton shape and motion to the gesture models. The recognized gestures type, position and body stereo mask (310) are provided for graphics rendering (124).

Environment Tracking

Figure 9:
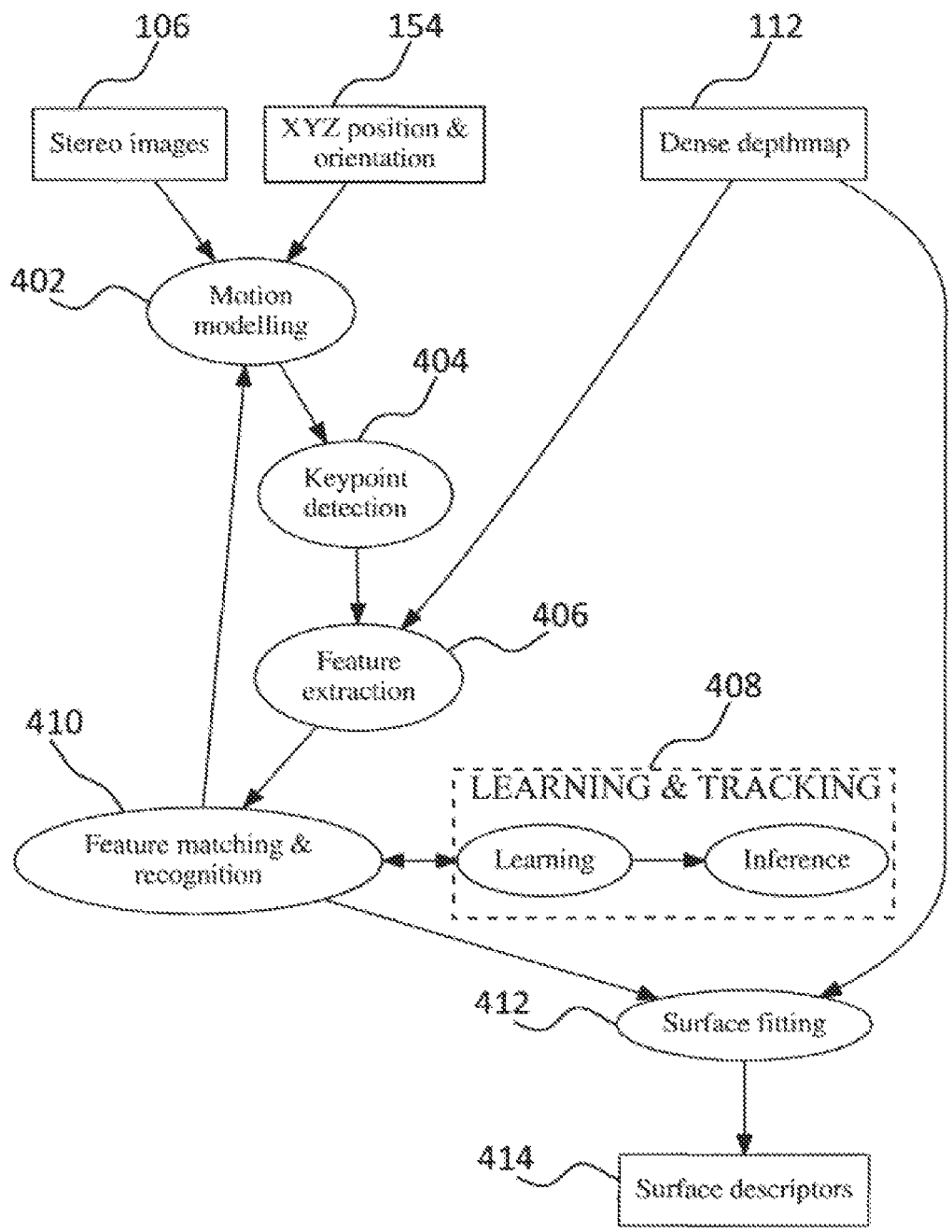
FIG. 9 is a flow diagram of an exemplary process to achieve environment tracking.

FIG. 9 shows a flow diagram of an exemplary process to achieve environment tracking. The inputs to the tracking framework are the color stereo images (106), a depth map (112) estimated by the active stereo method and/or the ToF camera (72), and the XYZ position from the output of positional tracking (154). The process encompasses a motion model (402) to improve efficiency leveraging the positional tracking output and exploiting the previously inferred object locations. For example, the motion model (402) can be constructed by using a particle filter or Kalman filter. Next, the process detects interesting key-points (404) such as Harris corners, local extrema points based on invariant Hu-Moments or determinant of Hessians. Features local to such keypoints are extracted (406) by robust feature descriptors such as Histogram of Gradients or Haar-like feature descriptors. Much like positional tracking, the environment is assumed to be stationary. Thus, any moving features are filtered out by a RANSAC method with rigid motion assumptions. A classification algorithm (408) such as support vector machines, is utilized to teach a model to track and recognize those features. Finally, surface descriptors are estimated (414) by fusing the dense depth map (112) with the output (410) of the feature recognition stage.

Mixed Reality Compositing

To achieve real-time fusion of the stereo pass-through cameras (62, 64) and virtual image elements, the compositing is done on the HMD (7). This avoids sending high resolution pass-through camera streams to an external computer. This tends to reduce the required transfer bandwidth, which in turn reduces the overall latency. An 8-bit alpha mask A is used to specify the following situation:

(i) if the virtual graphics are opaque A=255;

(ii) if they have some amount of transparency 0<A<255; and (iii) if they are invisible (A=0).

Figure 10:
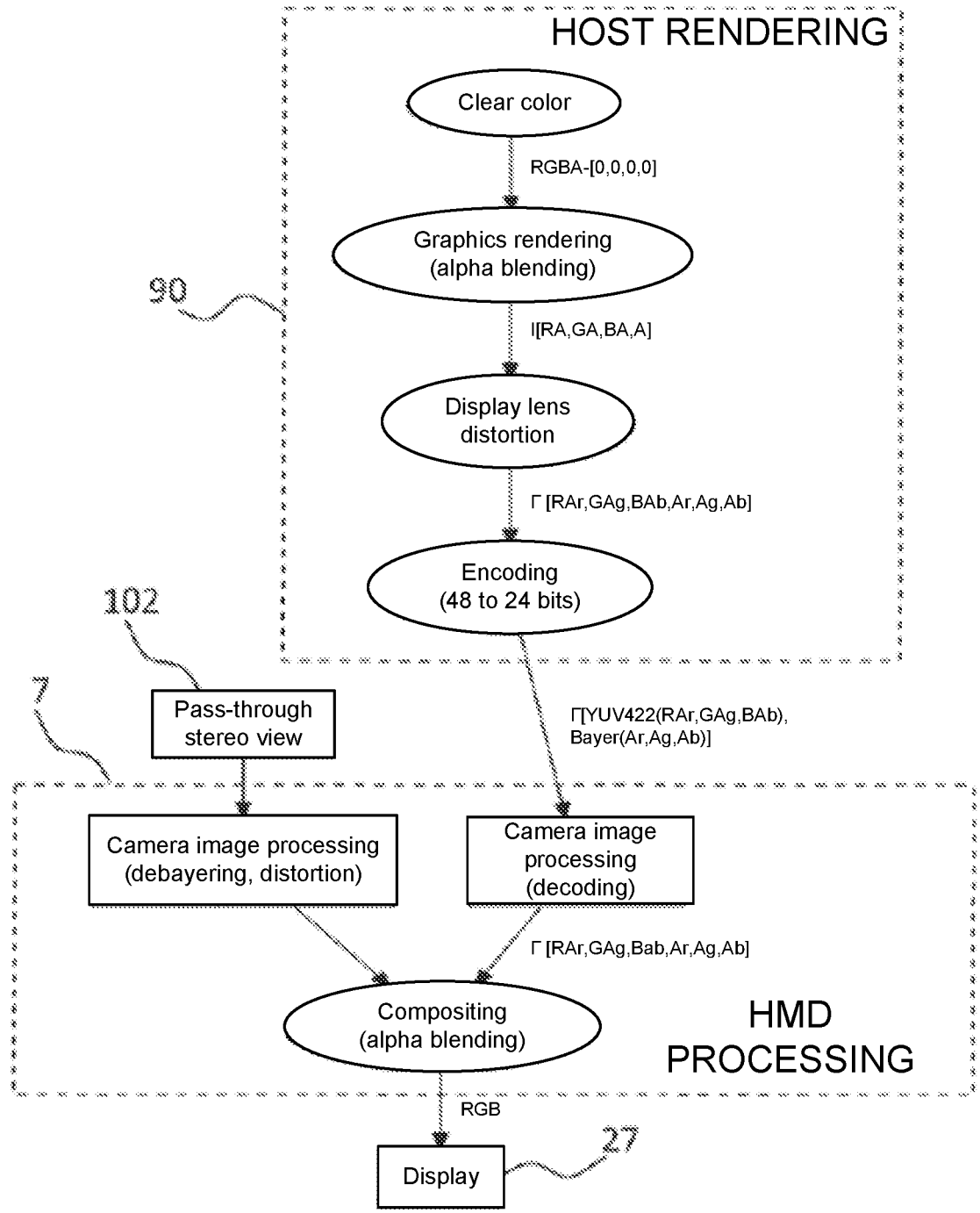
FIG. 10 is a flow diagram of an exemplary process to achieve graphics rendering and compositing.

It is to be noted that a virtual object should be invisible if it is occluded by the user's hands (16) or other objects in the environment. Occlusion masks can be found by comparing the calculated depth of each pixel with that of the virtual object(s). The camera images are blended per pixel channel accordingly following a linear model: $1/[R,G,B]*A/([R,G,B]+J/f[R,G,B] *(1-A/c[R,G,B])$, where \k is the virtual color at pixel k and Jk is the camera color at pixel k. Note that the alpha mask A needs to be different in each color channel [R,G,B], because each channel is remapped to correct color aberration of the eyepieces. If this remapping is done on an external computer, then a total of 6 channels per pixel (namely R, G, B, Ar, Ag and Ab) need to be sent to the HMD (7). FIG. 10 shows a flow diagram of an exemplary process to achieve graphics rendering and compositing (130). The data is encoded on a host computer (90), sent in a standard 24 bit per pixel format and decoded back onto the HMD (7). The three color channels are encoded into two channels using the YUV422 format, and the two alpha channels are mapped in a single Bayer channel. It is to be noted that because alpha blending is used when rendering the virtual scene, the output color is actually $1/([R,G,B]*A/([R,G,B]$ and not the actual color $1/[R,G,B]$. This is not an issue however as it corresponds to the first term of the blending equation, when compositing the camera images.

IR Speckle Projector

Figure 11:
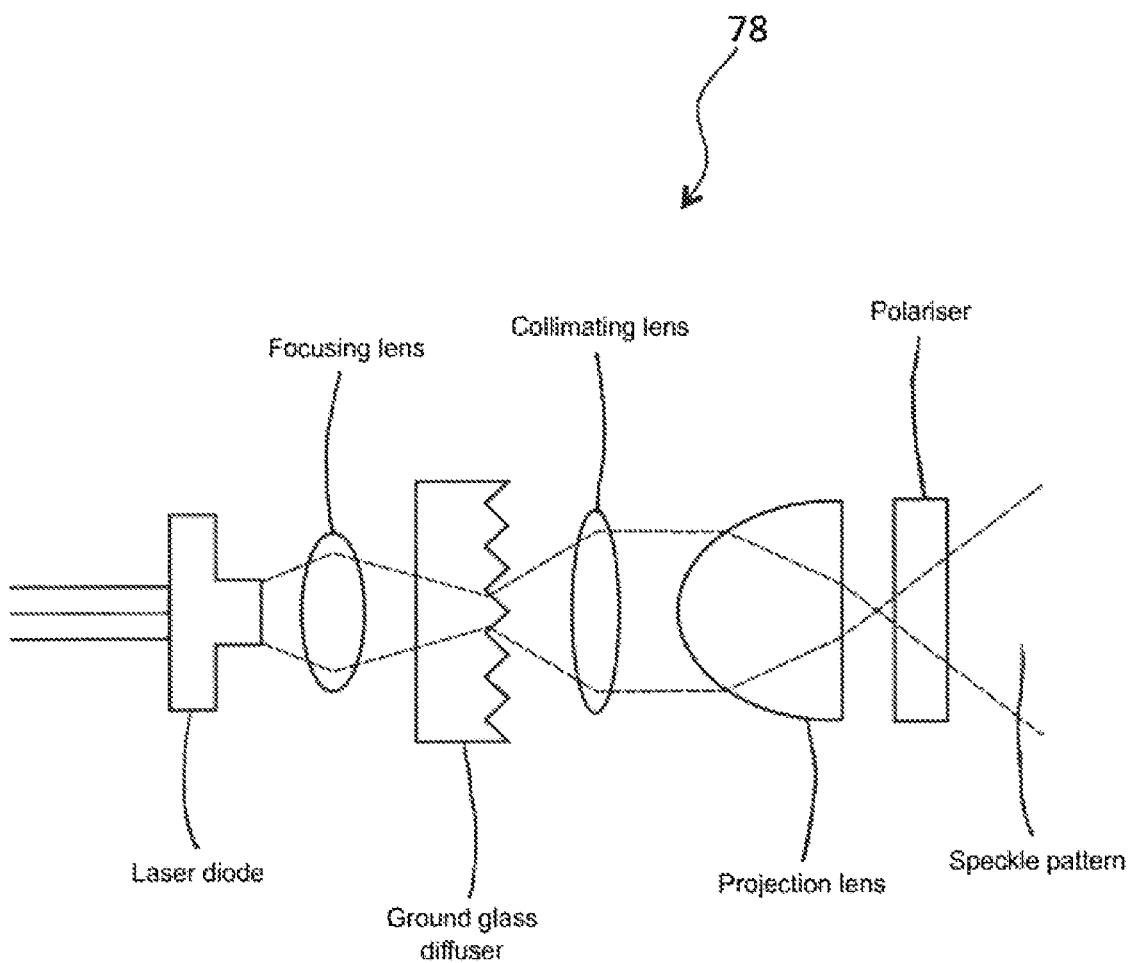
FIG. 11 is a schematic representation of the speckle projector.

The HMD (7) includes a speckle projector (78) which casts/projects a fixed pattern onto the scene to improve the quality of the dense depth map estimated from active stereo matching. While a base station (external to the HMD) offers the advantage of projecting some stationary texture points on the environment, covering the whole room with a single base station may be difficult because of occlusion. As a solution, embedding a projector in the HMD (7) offers the flexibility of moving around in any room (without the need to setup up a base station) while always projecting where the user is looking. Two embodiments of the speckle projector (78) are presented. In the first embodiment, shown in FIG. 11, the speckle projector (78) generates an interference pattern of a laser beam passing through a surface diffuser. In this case, the pattern generated by the speckle projector (78) is random and its granularity can be adjusted by either focusing the beam on a spot of different size on the diffusing surface or by changing the diffusing surface. In the second embodiment, the speckle projector (78) generates a speckle pattern by the far field diffraction of a laser beam passing through one or many diffractive optical elements. The signal to noise ratio (SNR) is significantly improved by adding a polarizer. Several refractive, reflective or absorbing optical elements can be added for beam shaping. Typically, lenses will always be present. A protective housing can be added to restrain access to zones of high laser power.

Dense Depth Map

Standard stereo depth map methods find for each pixel in the first image the best pixel match in the second image. Neighborhoods around pixels can also be considered instead of only single pixels. A match usually involves finding the lowest pixel intensity difference (or sum of differences when a neighborhood is used). As a preprocessing step, the images are rectified so that the search space for a match is a single horizontal line. Calculating a depth map using stereo vision typically results in errors or gaps in regions of the scene where there is not enough texture that can be used for distinctive stereo matching (e.g., uniform features or blocks on a white wall or surface). The random infrared (IR) speckle pattern projector (78) is used in order to overcome this problem. The speckle projector (78) adds texture to the scene to produce a dense depth map. If RGB/IR sensors (82, 84) are used, then a RGB-D output (color+depth) is directly available. Otherwise, the colors of the pass-through view can be mapped onto the depth map.

Time-Multiplexing

Figure 12A:
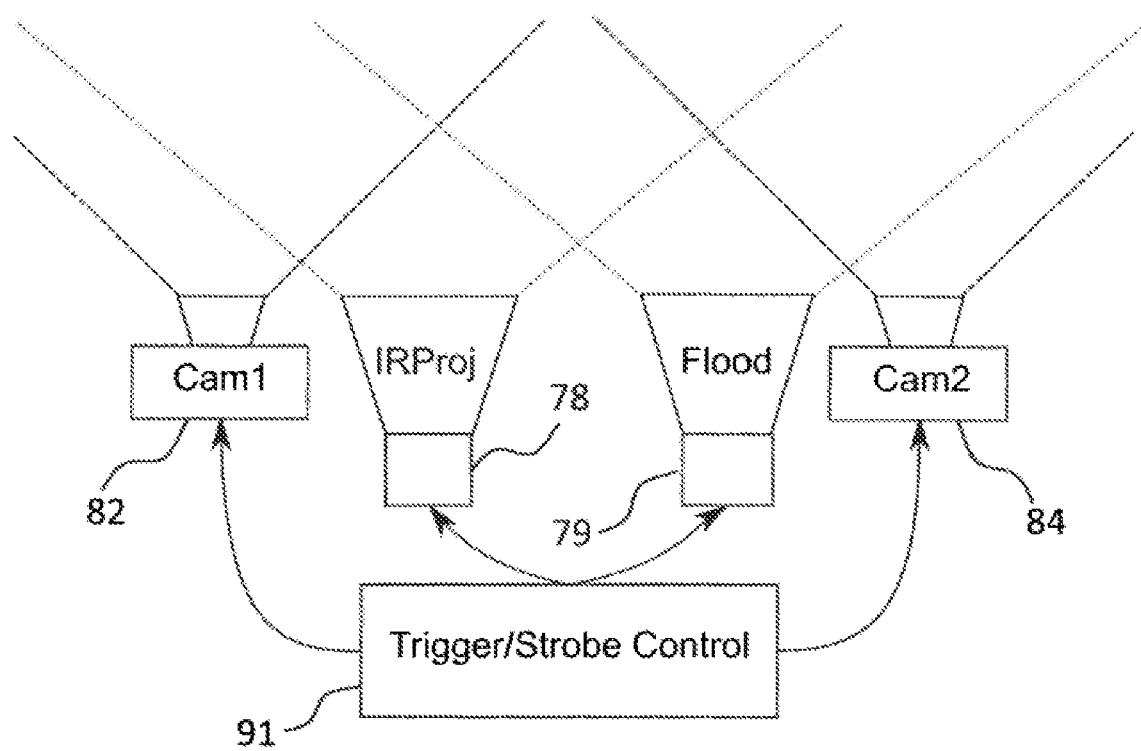
FIG. 12A is a schematic representation of an exemplary embodiment of the time-multiplexing setup.
Figure 12B:
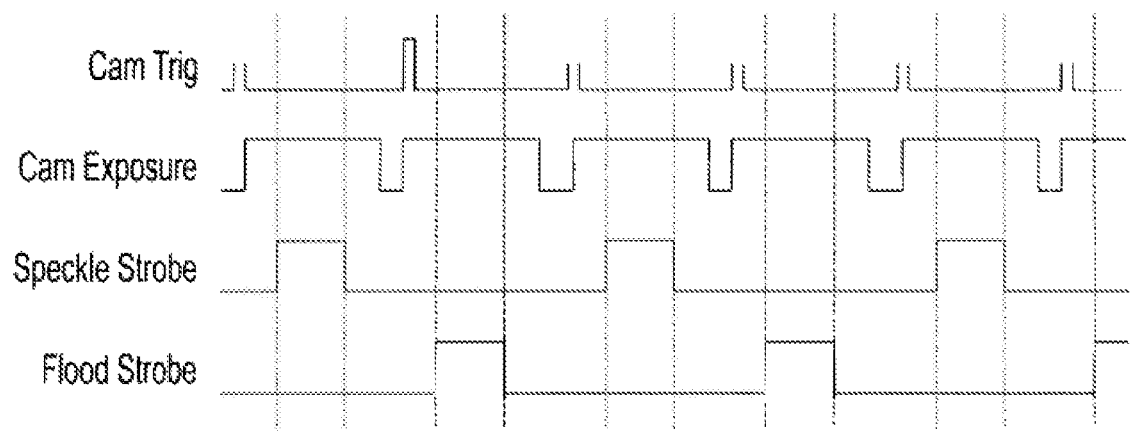
FIG. 12B is a timing diagram of the time-multiplexing setup.

If the pair of IR stereo cameras is used for both stereo tracking and dense depth sensing (i.e. RGB/IR cameras (82, 84)), then there is conflict because the speckle pattern cannot be used while tracking environment features. The added speckle pattern projected in front of the HMD (7) creates two overlapping signals: the fixed speckle pattern and the environment features moving in the images depending on the head motion of the user (1). To overcome this, a time multiplexing approach where the speckle pattern projector (78) and an optional IR flood light are strobed in an interleaved fashion instead of being continuously illuminated may be used, thereby decreasing the output rate by a half. FIG. 12A shows a schematic representation of an exemplary embodiment of the time-multiplexing setup an example setup using two cameras (82, 84), an IR speckle projector (78), an IR flood light (79) and a trigger and strobe controller (91). The controller (91) is used to synchronize the cameras' (82, 84) exposure with the strobe of the projector (78) and flood light (79). FIG. 12B shows a timing diagram of the time-multiplexing setup. The frames where the speckle pattern projector (78) and flood light (79) are activated are shown, respectively, in dotted and dashed lines. The time-multiplexing approach enables the HMD (7) to acquire the images from visual sensors at the maximum frame rate (e.g., 90 fps), so that the HMD (7) is able to extract a dense depth map, and 2-dimensional (2D) feature descriptors each at the half of the maximum frame rate (e.g., 45 fps). The time-multiplexed or interleaved output of the cameras (82, 84) thus provide information that can be useful for 2D feature extraction, 3D feature extraction and dense depth map estimation.

IR Wavelengths and Filters

The exemplary embodiment of the HMD (7) illustrated in FIG. 4A is composed of several IR emitters and sensors, namely a speckle projector (78), LED flood lights (74, 75, 76, 77), a ToF camera sensor (72) and IR camera sensors (66, 68). To minimize signal interference and saturation, the ToF camera sensor (72) advantageously uses a different wavelength than the other emitters. For instance, the ToF camera sensor (72) can use a wavelength of 850 nm or 940 nm, while the speckle projector (78) and LED flood lights (74, 75, 76, 77) use a wavelength of 808 nm. The IR camera sensors (66, 68) have an IR bandpass filter centered on that same wavelength. It should be noted that camera exposure time, sensor gain, and the intensity of both the LED flood lights (74, 75, 76, 77) and the speckle pattern of the speckle projector (78) are modulated in real-time to avoid image saturation and maximize dynamic range.

Although the present disclosure has been described by way of particular non-limiting illustrative embodiments and examples thereof, it should be noted that it will be apparent to persons skilled in the art that modifications may be applied to the present particular embodiment without departing from the scope of the present disclosure as hereinafter claimed.

What is claimed is:

1. A method comprising:
   at a head-mounted device (HMD) including non-transitory memory, one or more processors, and a communications interface for communicating with first and second RGB stereo-cameras, an infrared (IR) projector, one or more IR sensors, and a display;
   obtaining, via the first RGB stereo-camera, a first stereo image of a physical environment;
   obtaining, via the second RGB stereo-camera, a second stereo image of the physical environment;
   projecting, via the IR projector, an IR pattern of IR electromagnetic radiation onto the physical environment;
   obtaining, via the one or more IR sensors, texture information for the physical environment associated with a reflection of the IR pattern;
   generating a dense depth map by matching each pixel in the first stereo image to a different pixel in the second stereo image based at least in part on the texture information;
   generating a display image by compositing virtual content with the first and second stereo image based on the dense depth map; and
   displaying, via the display, the display image.

2. The method of claim 1, wherein the first and second RGB stereo-cameras and the one or more IR camera sensors share a common axis.

3. The method of claim 1, further comprising:
   generating, via the IR projector, the IR pattern according to one of a random or pseudo-random algorithm.

4. The method of claim 1, wherein a granularity of the IR pattern is adjusted by one of: (A) focusing the IR pattern on a spot of a different size on a diffusing surface or (B) changing the diffusing surface.

5. The method of claim 1, wherein the IR pattern corresponds to an interference pattern of a laser beam passing through a surface diffuser.

6. The method of claim 1, wherein the IR pattern corresponds to a far field diffraction of a laser beam passing through one or many diffractive optical elements.

7. The method of claim 1, wherein the IR speckle projector includes a polarizer.

8. The method of claim 1, wherein the communications interface of the HMD also communicated with one or more IR flood lights, and the method further comprising:
operating the IR projector and the one or more IR flood lights according to a temporal multiplexing scheme.

9. The method of claim 8, further comprising:
modulating at least one of exposure time, sensor gain, and intensity of the IR projector and the one or more IR flood lights in real-time to reduce image saturation and improve dynamic range.

10. The method of claim 1, wherein the first RGB stereo-camera includes a first IR sensor among the one or more IR sensor, and wherein the first IR sensor corresponds to a near IR bandpass filter.

11. A head-mounted device (HMD) comprising:
a communications interface for communicating with first and second RGB stereo-cameras, an infrared (IR) projector, one or more IR sensors, and a display;
one or more processors; and
a non-transitory memory storing one or more programs, which, when executed by the one or more processors, cause the HMD to:
obtain, via the first RGB stereo-camera, a first stereo image of a physical environment;
obtain, via the second RGB stereo-camera, a second stereo image of the physical environment;
project, via the IR projector, an IR pattern of IR electromagnetic radiation onto the physical environment;
obtain, via the one or more IR sensors, texture information for the physical environment associated with a reflection of the IR pattern;
generate a dense depth map by matching each pixel in the first stereo image to a different pixel in the second stereo image based at least in part on the texture information;
generate a display image by compositing virtual content with the first and second stereo image based on the dense depth map; and
display, via the display, the display image.

12. The HMD of claim 11, wherein the first and second RGB stereo-cameras and the one or more IR camera sensors share a common axis.

13. The HMD of claim 11, wherein the first RGB stereo-camera includes a first IR sensor among the one or more IR sensor, and wherein the first IR sensor corresponds to a near IR bandpass filter.

14. The HMD of claim 11, wherein the communications interface of the HMD also communicated with one or more IR flood lights, and
wherein the one or more programs further cause the HMD to:
operate the IR projector and the one or more IR flood lights according to a temporal multiplexing scheme.

15. The HMD of claim 14, wherein the one or more programs further cause the HMD to:
modulate at least one of exposure time, sensor gain, and intensity of the IR projector and the one or more IR flood lights in real-time to reduce image saturation and improve dynamic range.

16. A non-transitory computer-readable medium having instructions encoded thereon, which, when executed by one or more processors of a head-mounted device (HMD) including a communications interface for communicating with first and second RGB stereo-cameras, an infrared (IR) projector, one or more IR sensors, and a display, cause the HMD to:
obtain, via the first RGB stereo-camera, a first stereo image of a physical environment;
obtain, via the second RGB stereo-camera, a second stereo image of the physical environment;
project, via the IR projector, an IR pattern of IR electromagnetic radiation onto the physical environment;
obtain, via the one or more IR sensors, texture information for the physical environment associated with a reflection of the IR pattern;
generate a dense depth map by matching each pixel in the first stereo image to a different pixel in the second stereo image based at least in part on the texture information;
generate a display image by compositing virtual content with the first and second stereo image based on the dense depth map; and
display, via the display, the display image.

17. The non-transitory computer-readable medium of claim 16, wherein the first and second RGB stereo-cameras and the one or more IR camera sensors share a common axis.

18. The non-transitory computer-readable medium of claim 16, wherein the first RGB stereo-camera includes a first IR sensor among the one or more IR sensor, and wherein the first IR sensor corresponds to a near IR bandpass filter.

19. The non-transitory computer-readable medium of claim 16, wherein the communications interface of the HMD also communicated with one or more IR flood lights, and
wherein the instructions further cause the HMD to:
operate the IR projector and the one or more IR flood lights according to a temporal multiplexing scheme.

20. The non-transitory computer-readable medium of claim 19, wherein the instructions further cause the HMD to:
modulate at least one of exposure time, sensor gain, and intensity of the IR projector and the one or more IR flood lights in real-time to reduce image saturation and improve dynamic range.

* * * * *